United States Patent
Schmall

[11] 4,036,323
[45] July 19, 1977

[54] VEHICLE CONTROL APPARATUS

[76] Inventor: Karl-Heinz Schmall, Moncalieristrasse 5, D-757 Baden-Baden, Germany

[21] Appl. No.: 542,056

[22] Filed: Jan. 17, 1975

[30] Foreign Application Priority Data

Jan. 25, 1974 Germany .......................... 2403586
Feb. 23, 1974 Germany .......................... 2408764

[51] Int. Cl.² ............................................ B60K 31/00
[52] U.S. Cl. ............................... 180/105 R; 123/102; 192/3 R
[58] Field of Search .............. 180/105 R, 105 E, 106, 180/109; 123/102; 192/3 R; 74/513

[56] References Cited

U.S. PATENT DOCUMENTS

| | | | |
|---|---|---|---|
| 2,852,086 | 9/1958 | Cordry | 123/102 |
| 2,911,077 | 11/1959 | Carter | 123/102 |
| 2,912,058 | 11/1959 | Sandor | 180/109 |
| 3,049,110 | 8/1962 | Kerr | 123/102 |
| 3,207,255 | 9/1965 | Hahlganss et al. | 180/105 R |
| 3,476,205 | 11/1969 | Kato | 180/105 R |

*Primary Examiner*—Philip Goodman
*Assistant Examiner*—Terrance L. Siemens
*Attorney, Agent, or Firm*—Larson, Taylor and Hinds

[57] ABSTRACT

An apparatus to automatically regulate the speed of a motor driven vehicle. An actuating member movable between an operative and an inoperative position, preferably into or out of cooperative engagement with the accelerator, is in turn operated by a connecting device. A speed control arrangement drivingly engages the connecting device when the actuating member is in its actuating position to in turn operate that part of the vehicle which controls its speed. A control circuit receives actual and ideal speed signals and emits a difference signal which in turn operates the speed control arrangement to in turn operate the connecting device. A setting arrangement may also be provided which operates only when the actuating member is in its inactive position to receive an actual value signal and to cause the ideal signal to agree with the actual value signal such that when the actuating member moves from the inactive position to its actuating position and while the actuating member is in the actuating position, the ideal speed signal is identical to the actual speed signal which exists when the actuating member changes over from its inactive position to its actuating position.

28 Claims, 6 Drawing Figures

VEHICLE CONTROL APPARATUS

FIELD OF THE INVENTION

The invention relates to an apparatus for the automatic regulation of the speed of a motor-driven vehicle, where the speed control device of the motor is connected by means of a transmission device with a pedal operable by the driver of the vehicle, while a regulator which likewise actuates the speed control device through a setting member is connected to a comparator which in turn is connected with an ideal value emitter and an actual value emitter for ascertaining the speed of the vehicle.

DESCRIPTION OF THE PRIOR ART

Forming of apparatus for the automatic regulation of motor vehicles have already been proposed and are known for example for the regulation of the speed of road vehicles. The regulation takes place by comparison of a value proportional to the speed of the motor vehicle with a value proportional to the ideal speed, and subsequent movement of a setting member which adjusts the speed control device of the motor, that is the carburettor or the injection pump, accordingly.

The setting member in a known apparatus is formed as a hydraulic piston which extends the effective length of the accelerator linkage, so that for example even when the accelerator pedal is unloaded the carburettor or injection pump is actuated.

The great disadvantage of such apparatus is especially due to the fact that installation of such regulating apparatus subsequent to the manufacture of the vehicle is expensive and complicated, and that furthermore there is danger that in dangerous traffic situations the changeover from automatic working to foot working takes too much time, or that their operational reliability is impaired as a result of rough handling in the course of time and thus dangerous situations can arise. Moreover by reason of their design such forms of apparatus are trouble-prone and expensive in production.

Particular difficulties exist moreover in practical operation in the changeover from speed control by the driver to speed regulation by the speed regulator. In most of the known forms of regulating apparatus in fact a manually settable ideal value emitter is provided which must be brought by hand to the ideal speed of the vehicle. This requires a certain amount of attention by the driver who is thus distracted from the road traffic.

SUMMARY OF THE INVENTION

The invention is based upon the problem of avoiding the disadvantages of the prior art, that is especially of producing a simple, operationally reliable speed regulating apparatus which can be installed subsequently to the manufacture of the vehicle without difficulty in many motor vehicle types.

The invention is further based upon the problem of avoiding the disadvantages of the prior art, that is especially of producing a regulating method and a regulating apparatus which avoids readjustment of the speed by a manually operable ideal value emitter and furthermore is simple to operate and economical and simple in design.

According to the invention this is achieved in a simple manner by providing in the vehicle in the vicinity of the pedal a changeover device operable alternatively to the pedal by the foot of the driver of the vehicle, for the activation of the automatic speed regulating system.

Thus primarily high operational reliability and simple operability are achieved, since the driver alternatively actuates either the accelerator pedal or the changeover device for the speed regulating system and on change of the foot position from the pedal to the switch device or from the switch device to the pedal a switch is effected in each case to automatic operation or normal operation respectively, without further measure. If in critical traffic situations a braking operation is to be initiated from automatic operation, obviously as soon as the foot leaves the switch device a changeover is effected to normal working without further activity by the driver and then the accelerator pedal is immediately returned into the rest position, as likewise takes place in the case of foot operation of the accelerator pedal. The changeover device can be fitted, even in the case of installation subsequent to the manufacture of the vehicle, in all types of vehicles, without difficulty in the vicinity of the accelerator pedal and the brake pedal in such a way that rapid and convenient changing over from one mode of operation to the other can be effected within a short distance from the brake pedal.

A reliable changeover from automatic working to normal working on release of the changeover device by the foot can be achieved especially if the setting member of the regulating apparatus is connected through a coupling with the accelerator pedal of the engine of the motor vehicle and if the said coupling is activated on actuation of the changeover device and de-activated on release of the changeover device from the pressure of the foot.

An electric motor driven by the vehicle battery is suitable as a setting actuator, but in specific cases other pneumatic, hydraulic or electro-mechanical setting actuators can be used.

The coupling can be realised especially simply if on the shaft of the electric motor a wheel is provided which can be brought into engagement with a shift rod which in turn is connected with the pedal for the deflection of the latter. The activation of the coupling can be effected through any desired transmission device, but the apparatus can be produced especially simply as regards design if the actuation takes place mechanically on actuation of the changeover device.

The changeover device can expediently be formed as a pivotable foot plate which can be deflected by the driver's foot. It is especially expedient to arrange the foot plate on the floor of the vehicle in front of the pedal, so that the driver's foot on releasing of the pedal can be placed simply upon the foot plate, whereby automatic operation is taken up simultaneously. Reliable shutting off of the automatic system in situations of danger can then be ensured if the foot plate is preloaded into the rest position by a spring.

The apparatus according to the invention is especially suitable for installation into motor vehicles of various types and models that have already have manufactured, if the foot plate, coupling and shift rod are arranged in common on a frame which can be secured to the floor of the vehicle and if on the foot plate there is arranged an approximately vertically pivotable additional pedal which on the one hand is connected with the shift rod and on the other hand can be applied to the pedal of the motor vehicle exerting a pressure similar to foot operation and can be pivoted in parallel with this pedal for the acceleration of the motor vehicle.

The switching on the regulator used in the automatic operation can be effected with the apparatus according to the invention by a switch fitted for example on the dashboard, but it is advantageous if an additional switch is provided on the foot plate which deactivates the regulator as soon as the driver takes his foot away from the foot plate.

If an electric motor is used it is advisable to arrange a self-locking gearing between the motor and the coupling so that the regulator may be designed in such a way that the motor comes to a halt when the ideal speed is reached, that is to say it comes into action only in the case of speed variations.

An ordinary worm wheel gearing is especially advantageously suitable for this purpose.

The invention can be realised advantageously and with high operational comfort if a control device connected with the steering wheel is connected with the ideal value emitter and/or with the comparator to reduce the ideal value in the case of travel on bends, so that the driver can drive with automatic operation even on winding roads. The additional control device connected with the steering wheel is switched so as to effect speed reduction corresponding to the radius of the bend.

In accordance with the invention an especially simple and jolt-free changeover to regulator operation is guaranteed if the ideal value emitter is kept continuously at the value ascertained by the actual value emitter during the time of the changeover to driving governed by the driver.

The readjustment of the actual value emitter can be effected in this case by a separate setting device connected to the comparator. However the invention can be realised quite particularly advantageously and without additional expenditure on components if the ideal value emitter is simply connected with the setting actuator and automatically kept by the latter at the value of the actual value emitter during driving determined by the driver. When the driving operation is changed over it is then merely necessary to connect the speed control apparatus of the motor with the setting actuator and to separate the ideal value emitter from the setting actuator, in order that the speed reached before the changeover of the manner of operation may be kept constant by the regulator.

The technical progress and inventive content of the application are achieved as a whole by the new individual features and also especially by combination and subcombination of the utilised features.

DESCRIPTION OF THE DRAWINGS

Examples of the invention are described in greater detail hereinafter with reference to the drawings, wherein:-

Figure 1:
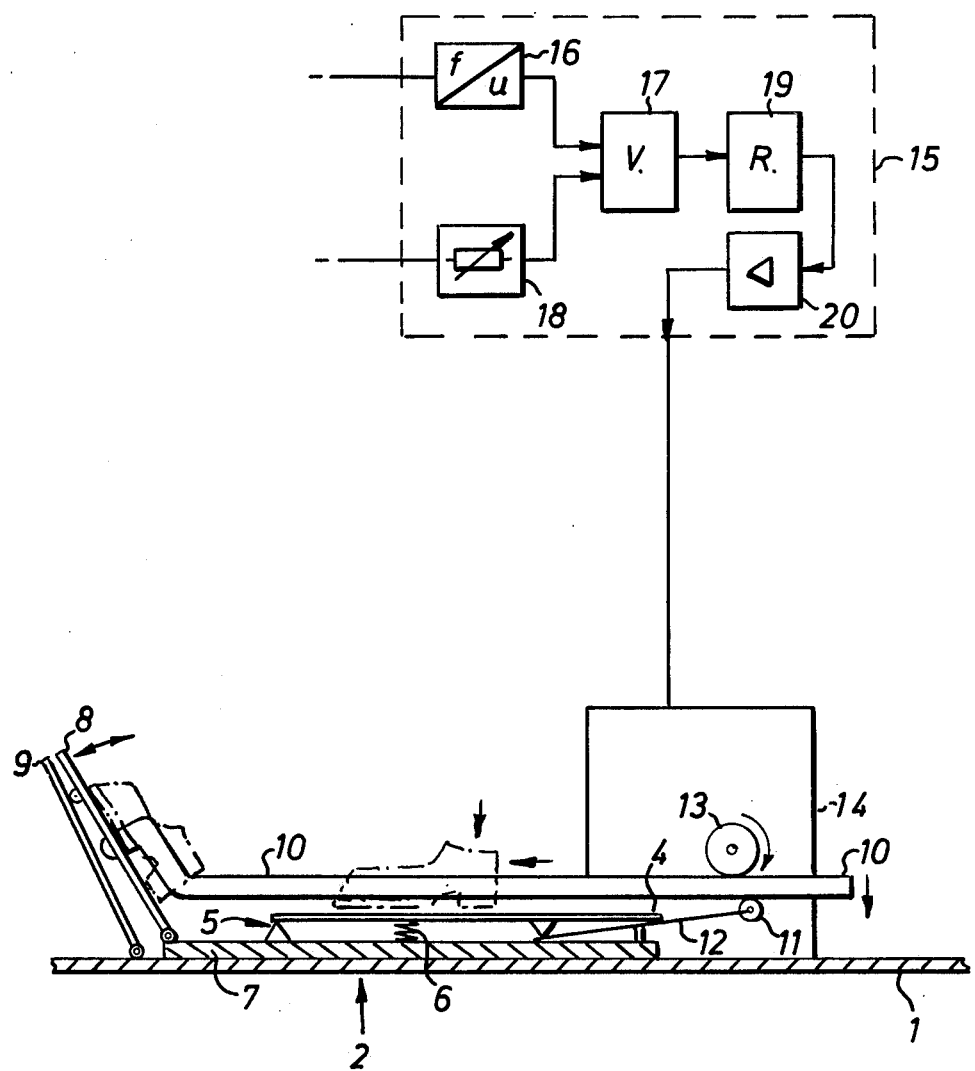
FIG. 1 shows the diagrammatic representation of a regulator apparatus.
Figure 2:
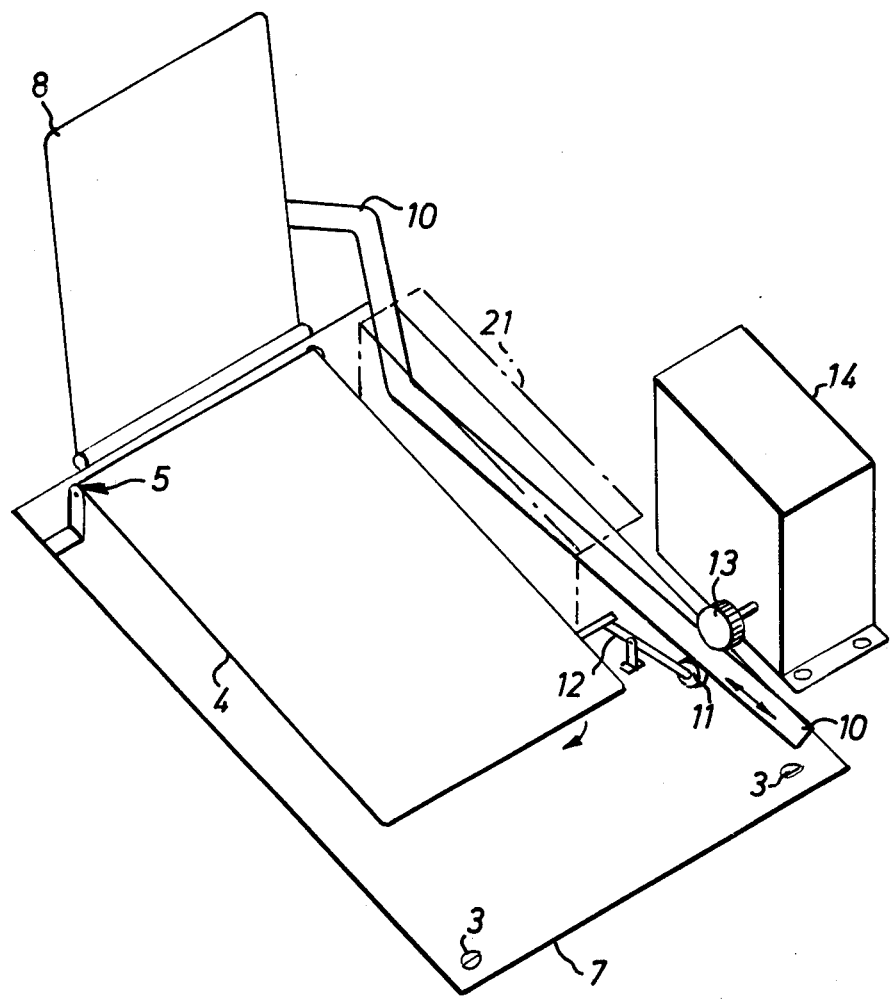
FIG. 2 is a perspective view of a switch device incorporated in the apparatus of FIG. 1.

According to FIGS. 1 and 2 a changeover device 2 is secured by screws 3 passing through a frame 7 to the floor 1 of a motor vehicle (not illustrated). The changeover device 2 comprises a foot plate 4 which can be pivoted about joints 5 against the force of a spring 6 towards the frame 7. Moreover on the frame 7 an additional pedal 8 is pivotably secured in such a way that an accelerator pedal 9 of the vehicle is deflected by this additional pedal. On the additional pedal 8 a shift rod 10 is secured which in turn rests on a presser roller 11. When the foot is set upon the foot plate 4 obviously the presser roller 11 is pressed by the lever 12 against the shift rod 10 in such a way that the latter is lifted and pressed against a wheel 13 of an electric motor 14. The wheel 13 and the shift rod 10 are here provided with a rubber covering in such a way that upon an activation of the electric motor 14 the wheel 13 drives the shift rod 10 longitudinally by friction.

As may be seen from FIG. 1, the electric motor 14 is here connected to a control appliance 15. The control appliance 15 comprises an actual value emitter 16 which is a frequency voltage converter and connected to the contact breaker of the motor vehicle in such a way that a voltage proportional to the rotation speed and thus to the vehicle speed is applied to the output of a sensing element.

Of course the speed - proportional voltage can also be obtained in another way, for example by means of a tacho-generator or by mechanical, electric or electro-optical tapping from speed measuring devices or rotation speed measuring devices present in any case in the vehicle.

The output of the actual value emitter 16 is connected to an input of a comparator 17 to the other input of which there is connected an ideal value emitter 18 which is a potentiometer.

The ideal value emitter 18 can be set by the driver.

As may be seen in the case of automatic operation the comparator 17 gives a signal which is proportional in sign and amount to the speed deviation to a regulator 19 until by the activation of the electric motor 14 thus effected, through an amplifier 20, the shift rod 10 and the additional pedal 8 have brought the accelerator pedal 9 into a position which corresponds to the ideal speed. However, as soon as the ideal speed is reached the voltage delivered by the actual value emitter 16 corresponds to the voltage preselected on the ideal value emitter 18, so that the comparator 17 no longer acts upon the regulator 19, whereby the electric motor 14 comes to a halt and the shift rod 10 is fixed in the position established.

In order to avoid damage or blocking of the presser roller 11, lever 12 or wheel 13 by the driver's foot, a cover plate 21 is provided which however is illustrated only partially in FIG. 2, for the sake of clarity.

In the change from automatic operation to normal operation the driver's foot is lifted from the rest position on the foot plate 4 and pressed again against the additional pedal 8. As soon as the foot plate 4 is relieved, it is raised by the spring 6. The lever 12 and presser roller 11 permit the shift rod 10 to descend, whereby this rod comes out of engagement with the wheel 13 and the additional pedal 8 and thus the accelerator pedal 9 are directly relieved of load and return immediately into the rest position.

Figure 3:
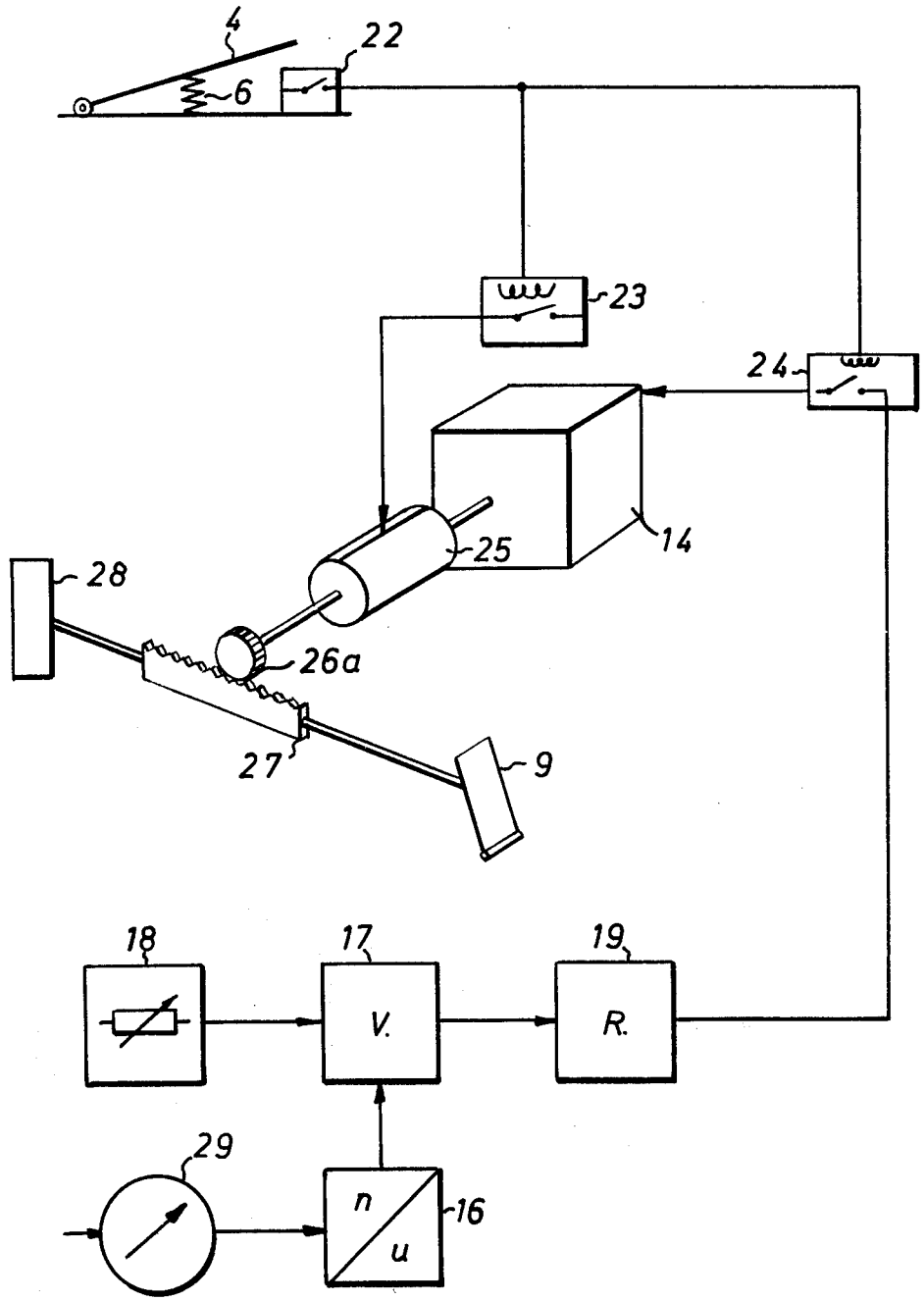
FIG. 3 shows diagrammatically a modification of the apparatus of FIG. 1.

FIG. 3 shows a modified example of the invention in which the foot plate 4 actuates an electric switch 22. This in turn is connected with two electromechanical switches 23 and 24 of which the first actuates an electromechanical coupling 25 and the second the electric motor 14 with the regulator 19.

In the electric motor 14 a worm wheel gearing (not shown) is provided which ensures that the drive output shaft 26 of the motor when halted retains the last position reached in each case.

The coupling 25 is connected with a toothed wheel 26a which in turn engages in a rack 27. The rack 27 is here arranged in the linkage which connects the accelerator pedal 9 with a diagrammatically illustrated carburettor 28 of an internal combustion engine.

The ideal value emitter 18 is a potentiometer, as in the example of FIGS. 1 and 2, while the actual value emitter 16 is designed as a voltage converter and is charged by a speed-proportional voltage tapped from an electronic revolution counter 29.

Both in normal driving and in automatic working a voltage is applied to the output of the regulator 19 in each case as soon as the effective speed of the motor vehicle does not correspond to the speed set on the ideal value emitter 18.

When the driver seeks to change over to automatic operation by loading the foot plate 4, as may be seen the electric switch 22 is actuated and the coupling 25 is actuated through the switch 23, whereby the toothed wheel 26a is connected with the drive output shaft 26. At the same time the electric motor 14 is connected to the regulator 19 and activated, unless the effective speed corresponds to the speed preselected on the ideal value emitter 18. The electric motor 14 then drives the toothed wheel 26a so that the rack 27 is driven longitudinally and the carburettor 28 is adjusted until the desired speed is reached.

Figure 4:
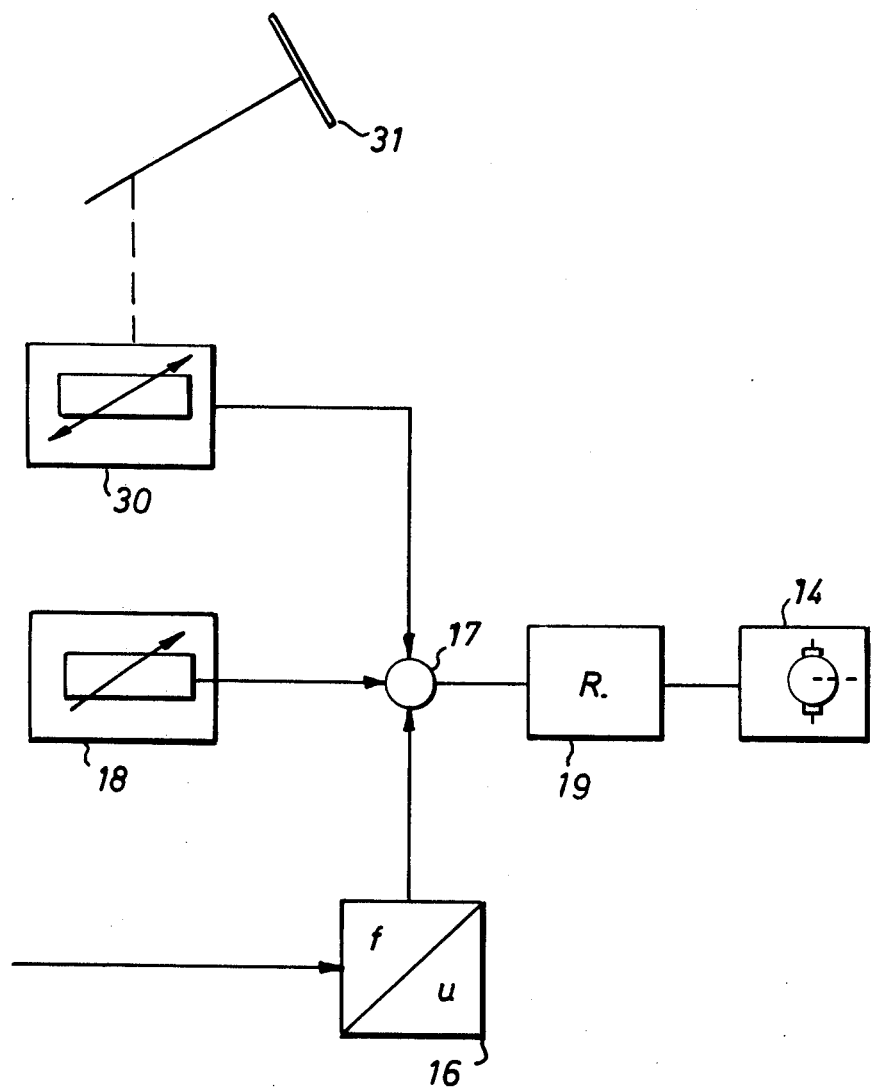
FIG. 4 shows the block circuit diagram of a regulating circuit.

FIG. 4 shows a regulating circuit arrangement which is comparable in the essential elements with the regulating circuit arrangement according to FIG. 1.

In this case again as setting member an electric motor 14 is connected to a regulator 19 which in turn is connected through the comparator 17 with the ideal value emitter 18 and the actual value emitter 16.

In addition however a control device 30 in the form of a potentiometer is connected to the comparator 17. This control device 30 is mechanically connected with the steering wheel 31 of the motor vehicle in such a way that in the case of an increasing steering lock the value predetermined by the ideal value emitter 16 is automatically reduced, so that subsequently the speed of the vehicle is reduced by the regulator 19 and electric motor 14 in the manner as described in connection with FIGS. 1 to 3. In this way the speed of the motor vehicle is regulated back automatically in a simple manner in each case on entry into bends, and after travelling through the bend and when the steering is set straight the speed originally set on the ideal value emitter is reached again. Even in the case of a winding road this renders possible driving with automatic speed regulation and avoids frequent changing from automatic working to normal working and vice versa.

Figure 5:
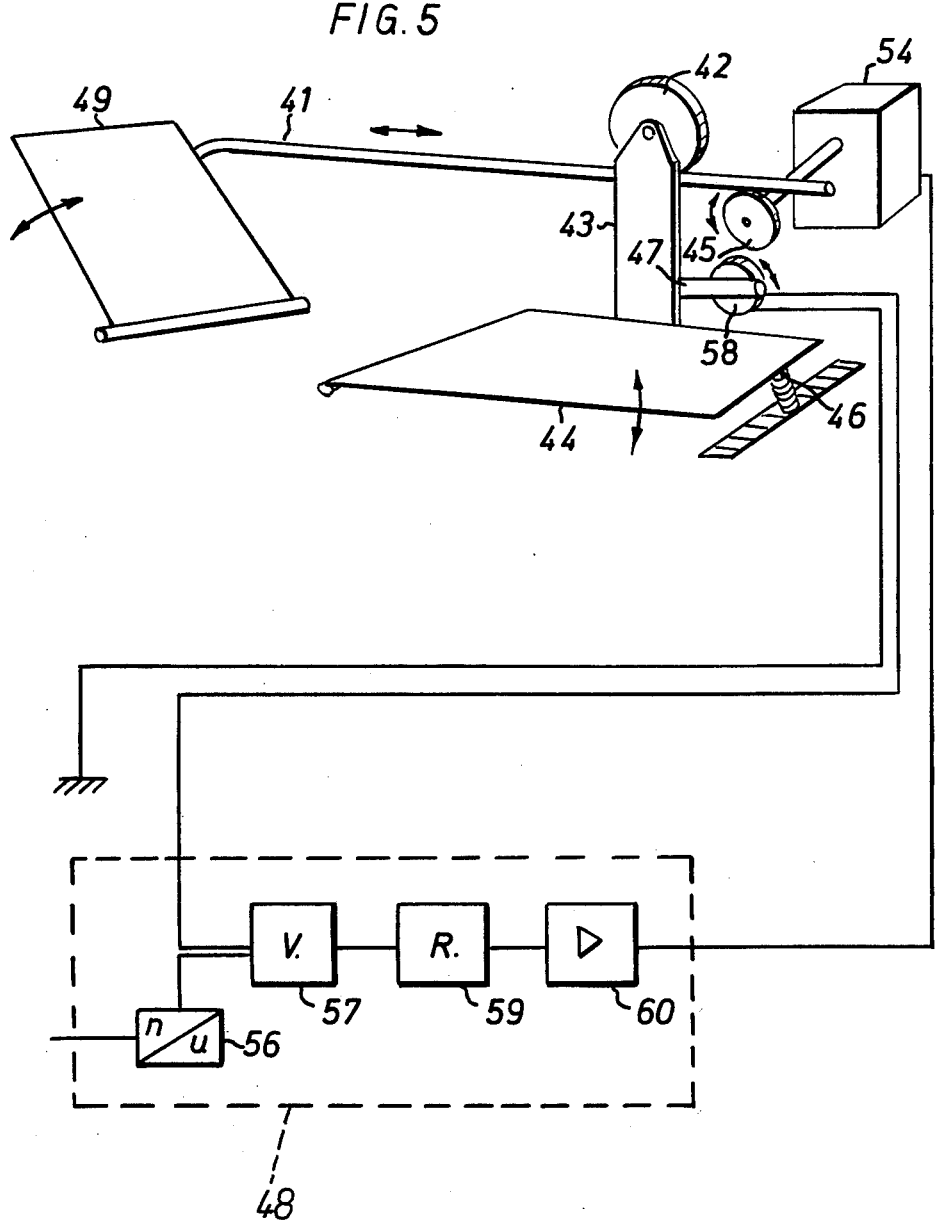
FIG. 5 shows diagrammatically and partly in perspective of a further form of regulator apparatus.

According to FIG. 5 an accelerator pedal 49 of a motor vehicle (not illustrated) with an internal combustion engine is connected with a rod 41. The rod 41 can be pressed against a drive wheel 45 of a motor 54 by a presser roller 42 which is secured by means of a connection piece 43 to a foot plate 44. As long as the foot plate 44 is unloaded by the driver's foot, it is lifted by the spring 46 in such a way that the rod 41 is not loaded by the pressure roller 42 and thus rests only loosely on the drive wheel 45 without being moved by the latter.

However in this rest position a rotary potentiometer 58 secured by means of an angle piece 47 to the connection piece 43 is pressed against the drive wheel 45 and turned by the latter when the drive wheel 45 rotates. As illustrated, the rotary potentiometer 58 is formed as ideal value emitter of the regulating apparatus 48 and is connected to one input of a comparator 57, to the other input of which there is connected an actual value emitter which is a rotation speed voltage converter, the voltage value of which is proportional to the speed of the vehicle.

The comparator 57 sends signals to a regulator 59 until by the signal from the amplifier 60 the motor 54 has either - in the case of regulating operation - deflected the accelerator pedal 49 so far that the value set on the ideal value emitter (rotary potentiometer 58) is ascertained by the actual value emitter 56 after appropriate speed variation of the vehicle, or - in the case of driving governed by the driver - the motor 54 has regulated the ideal value emitter (rotary potentiometer 58) to the value which corresponds to the speed of the vehicle, that is the output on the actual value emitter 56. Therefore, when the driver transfers his foot from the pedal 49 to the plate 44, the vehicle continues without any jolt. The potentiometer 58 can then be manually adjusted as required.

For changing over between the two methods of operation thus only a corresponding deflection of the foot plate 44 by the driver is necessary, while due to the constant readjustment of the ideal value emitter (rotary potentiometer 58) during foot operation, by the regulating apparatus, the last speed before the changeover operation is retained without further intervention by the driver; moreover as may be seen absolutely jolt-free changeover operation is guaranteed.

Figure 6:
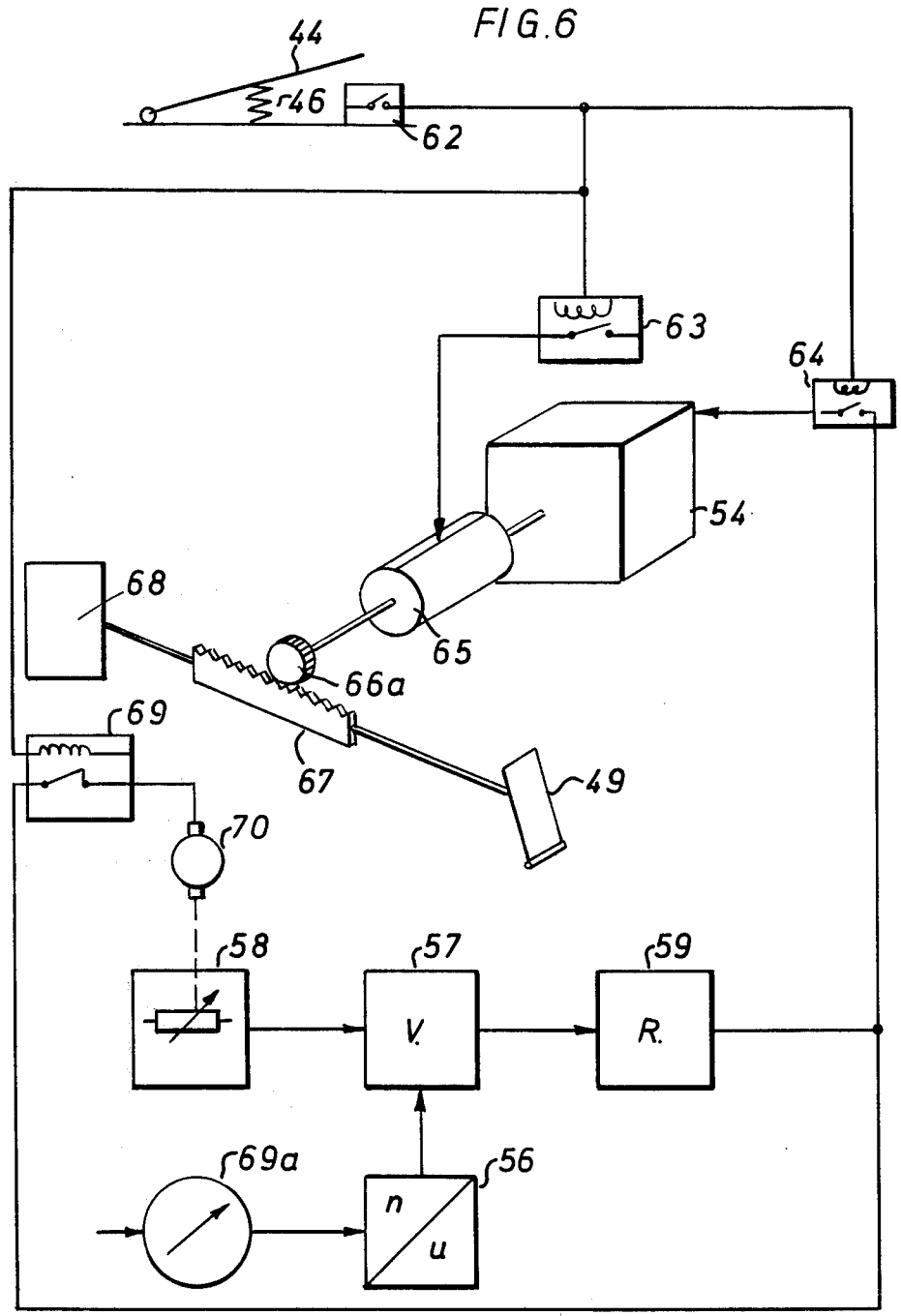
FIG. 6 shows diagrammatically a modification of the apparatus of FIG. 3.

FIG. 6 shows a modified example of the invention in which a rack 67 is provided in the linkage between a pedal 49 and a diagrammatically illustrated carburettor 68 of a conventional motor vehicle with an internal combustion engine. The rack 67 can be driven by a toothed wheel 66a which is couplable through an electric coupling 65 with a motor 54. As soon as a foot plate 44 is deflected against the force of a spring 46 for the changeover to regulating operation, an electric switch 62 is actuated which in turn activates relays 63 and 64. The relay 63 then actuates the coupling 65 while the relay 64 connects the motor 54 to the regulator 59, which by feeding the motor 54 with setting signals effects a displacement of the rack 67 and thus adjusts the carburettor 68 until after appropriate speed variation the value given by a measuring apparatus 69a ascertained on the actual value emitter 56 corresponds to the value set by the ideal value emitter 58.

In the case of foot operation by the driver, after the foot plate 44 is released the motor 54 is again disconnected from the regulator 59 and at the same time the coupling 65 is de-activated. However, at the same time a normally closed contact of a relay 69 connects a motor 70, formed as a setting apparatus, to the regulator 59. In driving then as may be seen the motor 70 is actuated by the regulator 59 continuously by signals when by reason of a variation of speed, the value emitted by the actual value emitter 56 no longer corresponds to the value set on the ideal value emitter 58.

The readjustment of the ideal value emitter 58 then effected by the motor 70 results in reliably jolt-free transition from foot operation to regulating operation, where after the opening of the normally closed switch of the relay 69 the motor 70 is stopped and the ideal value emitter 58 thus reliably remains in the last position reached before the changeover throughout the entire regulating operation, and thus ensures the maintenance of the selected speed. As may be seen the switchover device, setting member, coupling, force transmission and regulating units can also be realised in any other desired mechanical, pneumatic and/or hydraulic manner known per se, without thereby departing from the scope of the invention.

I claim:

1. An apparatus for automatically regulating the speed of a motor driven vehicle comprising:
   an actuating member separate from, and adapted to be placed in the vehicle rearward of, the vehicle accelerator pedal and movable from a raised inactive position to a lowered actuating position under the action of the driver's foot, and means for moving the actuating member back to its raised inactive position when not being urged to said lowered actuating position,
   connecting means connectable to a part of the vehicle which controls the speed of the vehicle motor,
   a speed control means selectively drivingly engagable with the connecting means upon and in response to movement of the actuating member to said lowered actuating position for moving the connecting means, to in turn operate the said part of the vehicle which controls the speed of the vehicle,
   and a control circuit including first emitter means for emitting a first signal representative of the actual vehicle speed and a second emitter means for emitting a second signal representative of an ideal speed, and control means for receiving said first and second emitted signals and for emitting a difference signal representative of the difference therebetween and for operating said speed control means in response to and by an amount related to the difference signal to in turn move the connecting means in response to said difference signal.

2. An apparatus according to claim 1, said connecting means being positionable to engage the vehicle accelerator which thereby constitutes the part of the vehicle which controls the speed of the vehicle motor.

3. An apparatus according to claim 2, said connecting means including a reciprocable member extending rearwardly from the accelerator, said speed control means including a motor, the output shaft of which engages the reciprocable member when the actuating member is in its actuating position.

4. An apparatus according to claim 3, said connecting means including a plate positionable against the accelerator pedal of a vehicle, said reciprocable member connected to the plate.

5. An apparatus according to claim 1, said speed control means being a motor, the output shaft of which is engageable with said connecting means.

6. An apparatus according to claim 5, said connecting means being a reciprocable member, and wherein the output shaft of the motor engages the reciprocable member when the actuating member is in its actuating position.

7. An apparatus according to claim 6, including a clutch means between the motor and the reciprocable member, and means for actuating said clutch when the actuating member is moved to its actuating position.

8. An apparatus according to claim 7, including switching devices operable to close the clutch and connect the control circuit to the speed control means upon movement of the actuating member to its actuating position.

9. An apparatus according to claim 1, said speed control device being a reversible electric motor.

10. An apparatus according to claim 9, said connecting means being a reciprocable member, said reversible electric motor having a rotatable member on its output shaft which engages the reciprocable member in the actuating position of the actuating member.

11. An apparatus according to claim 10, in which said actuating member comprises a foot plate pivotally mounted close to the vehicle floor, a spring mounted to hold said foot plate in said raised inactive position, and mechanical means for drivingly connecting together said connecting means and said rotatable member when said foot plate is depressed and for disconnecting the connecting means and the rotatable member when the foot plate is released.

12. An apparatus according to claim 11, comprising a frame member adapted to be secured to the vehicle floor, said foot plate being pivotally mounted on the frame member, a pedal pivotally mounted on said frame about an axis positioned for said pedal to bear against the vehicle accelerator, said pedal being arranged to be actuated either by the driver's foot or by said reciprocable member, thereby to operate the vehicle accelerator.

13. An apparatus according to claim 10, comprising switch devices and means controlled by said switch devices for rendering said speed control means operative when said actuating member moves to its actuating position.

14. An apparatus according to claim 10, a worm wheel gearing providing a driving connection interposed between said rotatable member and said electric motor.

15. An apparatus according to claim 10, including an electromechanical shaft coupling for connecting said electric motor to said rotatable member, a switch device comprising an electric switch for actuating said shaft coupling in response to movement of the actuating member to its actuating position to provide a driving connection between said electric motor and said rotatable member.

16. An apparatus according to claim 1, including a steering emitter responsive to turning movements of a steering wheel and operative to emit a third signal varying according to said movements, said steering emitter being connected to said control circuit for providing an ouput signal modified in relation to turns negoatiated by the vehicle, the ideal value represented by the second signal being in effect reduced by said third signal.

17. An apparatus for automatically regulating the speed of a motor driven vehicle comprising:
   a motor control device for controlling the speed of the motor,
   a connecting means operatively connected to the motor control device for operative movement therewith,
   an actuating member movable between an inactive position and an actuating position,
   a speed control means drivingly engagable with the connecting means when the actuating member is in said actuating position to selectively move the connecting means to in turn move the motor control device, a control circuit including first emitter means for emitting a first signal representative of the actual vehicle speed and a second emitter means for emitting a second signal representative of an ideal speed, and control means for receiving said first and second emitted signals and for emitting a difference signal representative of the difference therebetween and for operating said speed control means in response to and by an amount related to the difference signal to in turn move the connecting means and hence also the motor control device in response to said difference signal, and including setting means operable only when the actuating member is in said inactive position, and not when said actuating member is in its actuating position, for receiving and actual value signal and transmitting it to the second emitter means to cause the ideal signal to agree with the actual value signal such that upon a change from said inactive position to said actuating position, and during the duration of time that the actuating member is in the said actuating position, the ideal speed signal is identical to that actual speed signal existing at the moment of changeover of the actuating member from said inactive position to said actuating position.

18. An apparatus according to claim 17, said setting means comprising a switching means for connecting the output of the control circuit to the second emitter means only when the actuating member is in its active position.

19. An apparatus according to claim 18, including a motor means connected between the control circuit and the second emitter means for operating the latter when the control circuit is connected to the second emitter means.

20. An apparatus according to claim 19, said speed control means comprising a further motor, the output shaft of which is operatively engagable with the connecting means, and including relay devices for connecting the control circuit to the speed control means and connecting the further motor with the connecting means upon movement of the actuating member from its inactive position to its actuating position.

21. An apparatus according to claim 20, said connecting means being a reciprocably moveable member which is moved by turning of the output shaft of the said further motor, and including a clutch means in the further motor output shaft between the further motor and the connecting means, said clutch means being actuated in response to closing of one of said relay devices.

22. An apparatus according to claim 21, said actuating member being a plate located immediately rearwardly of the vehicle accelerator pedal and moveable to a raised position at which it is inactive and a lowered position whereat it is actuated.

23. An apparatus according to claim 22, said connecting means including a reciprocably moveable member engagable and moveable by the speed control means when the actuating member is in its actuating position.

24. An apparatus according to claim 17, said speed control means including a motor receiving a signal from the control circuit and having an output shaft engagable with a reciprocable member, which forms a part of the connecting means, in the said actuating position.

25. An apparatus according to claim 17, said setting means including means for operatively engaging said speed control means with said second emitter means only when the actuating member is in its inactive position such that in the said inactive position the actual value signal is transmitted through the speed control means to the second emitter means.

26. An apparatus according to claim 25, said speed control means including a motor receiving a signal from the control circuit and having an output shaft engagable with the connecting means when the actuating member is in its actuating position and engagable with the second emitter means when the actuating member is in its said inactive position.

27. An apparatus according to claim 26, said actuating member being a plate located immediately rearwardly of the vehicle accelerator pedal and moveable to a raised position wherein it is inactive and a lowered position whereat it is actuated, and including a first angle piece extending upwardly from the plate, a presser device positioned to urge the connecting means into engagement with the speed control output shaft in the actuating position of the actuating member, a second angle piece operatively fixed with respect to the actuating member and carrying a rotary potentiometer which forms a part of the second emitter means, said rotary potentiometer positioned to engage the speed control output shaft and be turned by it when the actuating member is in its inactive position.

28. An apparatus according to claim 17, said speed control means being a reversible electric motor.

* * * * *